Patented Mar. 22, 1938

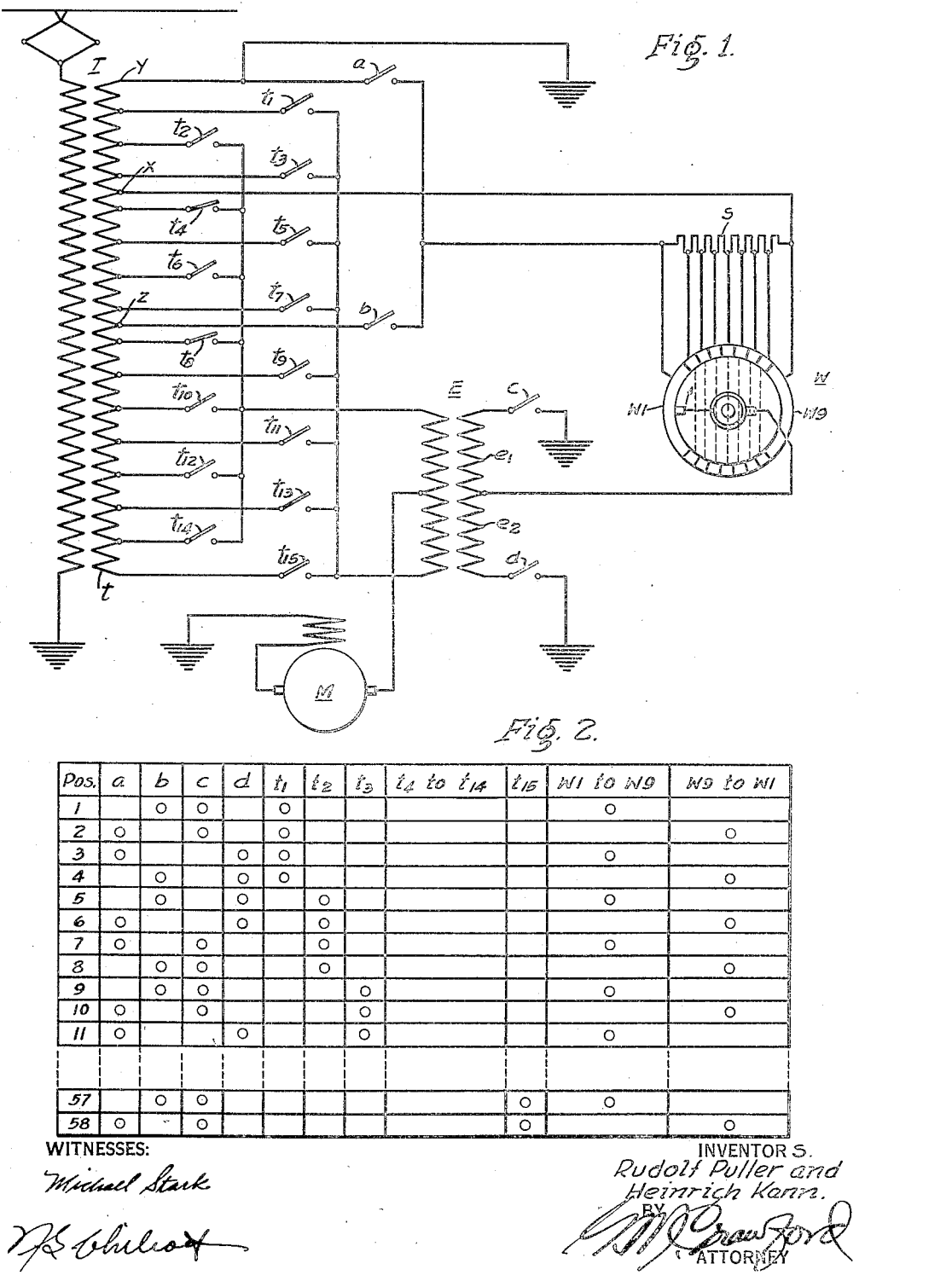

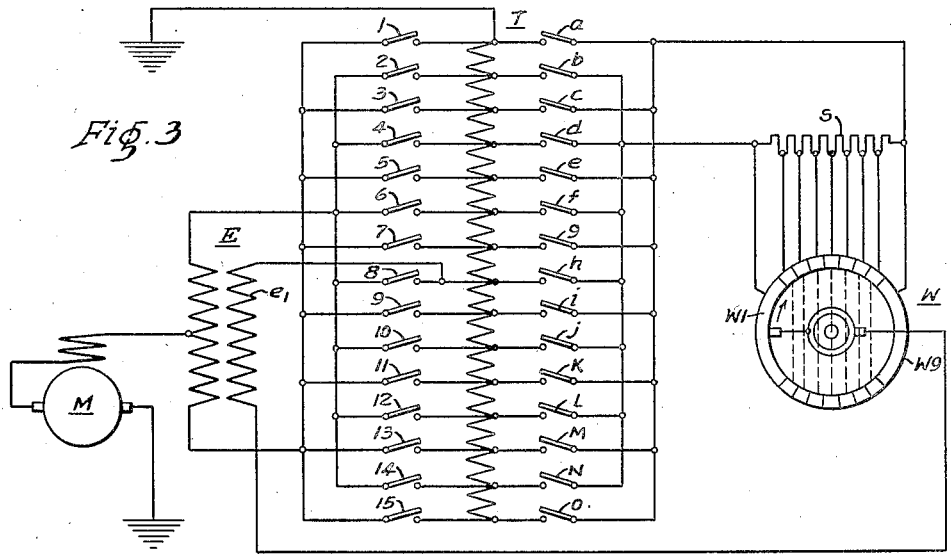

2,112,046

UNITED STATES PATENT OFFICE 2,112,046

CONTROL SYSTEM FOR ELECTRIC LOCOMOTIVES

Rudolf Puller, Berlin-Siemensstadt, and Heinrich Kann, Berlin-Charlottenburg, Germany, assignors to Westinghouse Electric & Manufacturing Company, East Pittsburgh, Pa., a corporation of Pennsylvania Application December 9, 1936, Serial No. 114,968
In Germany December 11, 1935

5 Claims.  (Cl. 171—119)

Vehicle control systems in which the motors are connected to the taps of the feeding transformer through a switch choke coil are known. To prevent the interruption of larger switching power at the switches connected to the taps of the transformer, the switching choke coil has in the past been provided with an exciting winding to which a variable and reversible excitation potential has been supplied, so that the switching choke coil operates as an auxiliary transformer.

The invention relates to an improvement of the above-described fine regulation control for electrical vehicles, and has for its object the provision of an improved method of controlling the excitation of the auxiliary transformer by means of a potential divider and a commutator regulator.

According to the invention, the commutator regulator connected to the potential divider is equipped with only a single brush or a single brush bolt and one slip ring. Consequently, the potential divider may be constructed essentially similar as similar arrangements with two brushes or two brush sets. According to a further development of the invention, the switch is so carried out that the brush or the brush bolt is connected through a slip ring with the center tap of the exciting winding of the switching choke coil connected in turn during regulation to neighboring taps of the transformer feeding the motors, and the portions of the exciting winding may be connected in such manner as to counteract each other through a switch arranged between them and ground. The potential divider connected to the commutator segments of the fine regulator is so arranged in this case that it may be connected alternately through the switch to different taps of the transformer which at one winding terminal is connected to ground. The reversing (or connection changing) takes place together with the control of the fine regulator and indeed in such manner that the potential divider resistance, which at one end is connected to a determined potential step of the transformer, is alternately connected through the switch to the grounded terminal of the transformer winding or to a transformer tap corresponding to a higher potential, the potential of the latter step having twice the value of the first-named potential step. To a certain extent, the potential divider and the exciting winding of the switching choke coil which functions as an auxiliary transformer are connected through the commutator regulator in series.

In the following, the invention is explained more in detail with reference to the drawings, in which:

Figure 1 is a diagrammatic view illustrating the circuit arrangement of a fine regulator controlling device constructed in accordance with the invention;

Fig. 2 is a chart showing the sequence of operation of a portion of the apparatus illustrated in Fig. 1;

Fig. 3 is a diagrammatic view illustrating a modified form of the invention, and Fig. 4 is a chart showing the sequence of operation of a portion of the apparatus illustrated in Fig. 3.

Referring to the drawings and particularly to Fig. 1, the secondary winding of the transformer T serving to feed the drive motor M is identified by the letter $t$. The motor M is connected to the center tap of a choke coil of the auxiliary transformer E, the windings of which are connected with the step switches $t^1$ to $t^{15}$ or $t^2$ to $t^{14}$. The exciting winding serves to excite the auxiliary transformer or switching choke coil, and its midtap is supplied through the commutator W with a potential regulable in fine steps. The exciting winding of the auxiliary transformer has two winding sections $e^1$ and $e^2$ which may be alternately connected to ground through their terminals away from the mid-tap through the switches $c$ and $d$.

The individual commutator segments of the commutator regulator W are connected to the taps of the potential divider resistor S, which may be constructed as an ohmic or inductive resistor. The right end of the potential divider resistor is connected rigidly to the tap $x$ of the transformer winding $t$ while the other end of the potential divider resistor may be alternately connected through the switches $a$ and $b$ to the taps $y$ and $z$ of the transformer winding. The tap $y$ is connected to the grounded end of the transformer winding where it has a potential of zero volts. A potential of 200 volts is, for example applied to tap $x$ and a potential of 400 volts to tap $z$.

In the following, the operation of a fine regulator controlling device constructed in accordance with the invention will be explained. When the vehicle is to start, switches $b$ and $c$ are first closed and in addition, step switch $t^1$ is connected. In such a case, when the brush of the fine regulator is in the W1 position, whereby the full potential of 400 volts is applied to the left half $e^1$ of the exciting winding $e$, a potential of opposite polarity to the potential and the transformer is induced in the switching choke coil or secondary winding of the auxiliary transformer; this potential is exactly as large as the step potential of the transformer. Now the fine regulator brush is rotated in the right-hand direction and thereby the potential supplied to the exciting winding $e$ is decreased from 400 volts to 200 volts. Correspondingly, the motor M is supplied with a rising potential. After the regulator has been rotated through 180°, or to the W9 position as indicated on the sequence chart in Fig. 2, the switch $b$ is disconnected and the switch $a$ is connected and the brush is rotated further in a clockwise direction, thereby the potential supplied to the exciting winding $e^1$ is slowly decreased from 200 volts to 0 volts. After the rotation of the brush to the W1 position, the exciting winding of the auxiliary transformer is accordingly unexcited so that in general no auxiliary potential is induced. Now the upper portion $e^1$ of the exciting winding of the auxiliary transformer E is disconnected through the switch $c$ and the lower sectional winding $e^2$ of the auxiliary transformer is connected through the switch $d$. If the brush of the fine regulator is further rotated in the clockwise direction, the potential supplied to the lower half of the winding rises gradually until, after a rotation of 180°, it amounts to 200 volts. After this, the switch $a$ is again disconnected and the switch $b$ is connected and the brush is further rotated; this results in a gradual rising of the potential supplied to the lower half of winding $e^2$ to 400 volts. By reason of the excitation of the auxiliary transformer through the lower half $e^2$, a potential is induced in the winding of the auxiliary transformer connected in the motor circuit which is added to the step potential of the feeding transformer $t$ and at the instant when the exciting winding of the auxiliary transformer is supplied with the full exciting potential of 400 volts becomes equal to the step potential of the transformer. Now the step switch $t^2$ may be connected in without manifestation of current impulses and the step switch $t^1$ may be interrupted without the manifestation of switching power. After the step switch $t^2$ is connected in, the commutator brush is further rotated whereby a potential is induced in the auxiliary transformer in the manner explained above; this potential is first opposite to the potential of the main transformer and after the reversal of its polarity is added to the potential of the main transformer.

In place of an auxiliary transformer or a switching choke coil E with sub-divided exciting windings, the portions of which are alternately connected to ground, a common auxiliary transformer with a reversing switch may be utilized; the reversing switch serves to reverse the polarity of the current in the exciting winding.

The apparatus according to the invention distinguishes itself above all else by the advantage that the fine regulator and the potential divider need only be designed for a quarter of the step power.

A further advantage of the circuit in accordance with the invention consists in that a great number of permanent speed steps are available. Taking this into consideration, the number of step switches and transformer taps may, under certain circumstances, be decreased, whereby the cam switch mechanism and the transformer may be considerably simplified and cheapened.

A modified form of the invention is shown in Fig. 3. In the embodiment of the invention described hereinbefore, a fine regulator control for electrically driven vehicles in which the motors are connected to the taps of the transformer windings through an auxiliary transformer with the aid of step switches, and in which an auxiliary potential of the same or opposite polarity to the main transformer potential is produced in the auxiliary transformer, is described. The exciting winding of the auxiliary transformer is connected to a definite tap of the main transformer through a potential divider and a commutator regulator connected thereto that has only a single brush and must be switched around during regulation, in accordance with whether an additional potential or reduction potential is to be produced.

In accordance with the modification of the invention shown in Fig. 3, an advantageous variation of the device described hereinbefore is secured by connecting the potential divider which is, in turn, coupled to the commutator regulator along taps of the low potential winding of the transformer, which on both sides are connected to a tap in turn coupled with one terminal of the exciting winding of the auxiliary transformer. The other terminal of the exciting winding is connected to the commutator regulator.

In the following, the invention is to be explained more in detail with reference to an embodiment. T is the low potential winding of the main transformer; the high potential windings of the transformer are not illustrated in the drawings for simplicity. The transformer T is provided with a number of taps 1 to 15, to which a vehicle motor M is connected with the aid of step switches through the auxiliary transformer E. By connection to the different taps of the transformer, the motor M may be supplied with every desirable potential. To avoid large switching current impulses, the auxiliary transformer is so excited through the potential divider and the commutator regulator W that in the secondary of the auxiliary transformer, auxiliary potentials are produced which make possible an arc free connection and disconnection of the step switches 1 to 15. The exciting winding $e^1$ of the auxiliary transformer E is connected with one of its terminals at the center tap 8 of the main transformer; the other terminal is connected to the brush of the commutator regulator W, the commutator segments of which are connected to the potential divider S. The potential divider S may be connected to the taps distributed along the circumference of the transformer winding which lie on both sides of the tap 8 with the aid of the switches $a$ to $o$. In this connection, the magnitude and polarity of the potential impressed on the commutator regulator, and thereby the potential impressed on the exciting winding $e^1$ of the auxiliary transformer, may be varied by varying the connections of the potential divider to the transformer winding. In the following the operation of the new circuit is explained.

During the upward regulation of the motor, the switch 1 is first closed; further, the switches $g$ and $h$ are closed as indicated in the chart shown in Fig. 4. A potential is now impressed on the potential divider S. Now the commutator regulator is rotated through 180° to the W9 position and thereby gradually the potential supplied to the exciting winding $e^1$ is gradually raised to the value of the potential between the tap switches $g$ and $h$. After this, the switch $h$ is disconnected and the switch $f$ is connected. By further rotation of the commutator to the W1 position, the potential of the exciting winding $e^1$ is brought to the value corresponding to the tap $f$. In the manner described, the potential in the exciting winding is gradually raised until it corresponds to the value of the potential between the tap switches $a$ and $h$. Now the step switch 2 may be connected in and the switch 1 may be connected out, since the potential impressed on the motor corresponds to half of the potential between the taps 1 and 2. Now the potential supply to the exciting winding $e^1$ is first decreased and finally by connecting the tap switches $h$ to $o$, is reversed, whereby in corresponding manner, first, the potential of opposite polarity to the potential of tap step 2 is decreased and finally reversed, so that the additional potential is added to the potential of step 2. In an analogous manner, the further regulation upward and downward may take place and thereby the potential divider resistor is in the transition from one switch step to another connected along the low potential winding of the transformer, as described.

Preferably, the control of the above-mentioned switches takes place by the operation of one or more cam switch drums, which, under certain circumstances, are mechanically coupled to each other and with the commutator regulator.

In detail, the described arrangement may obviously be changed. For example, the number of taps to which the potential divider is connected may be varied in any desired manner.

We claim as our invention:

1. In a tap-changing system for transformers the combination with a main transformer and a power circuit, of an auxiliary transformer, tap-changing switches for connecting the power circuit to the main transformer through the auxiliary transformer, and means comprising a commutator regulator having a rotatable brush and a potential divider for producing a potential in the auxiliary transformer of the same or opposite polarity to the main transformer.

2. In a tap-changing system for transformers the combination with a main transformer and a power circuit, of an auxiliary transformer, tap-changing switches for connecting the power circuit to the main transformer through the auxiliary transformer, and means comprising a commutator regulator having a rotatable brush and a potential divider for producing a potential in the auxiliary transformer of the same or opposite polarity to the main transformer, said potential divider and exciting winding of the auxiliary transformer being connected in series through the commutator.

3. In a tap-changing system for transformers the combination with a main transformer and a power circuit, of an auxiliary transformer, tap-changing switches for connecting the power circuit to the main transformer through the auxiliary transformer, and means comprising a commutator regulator and a potential divider for producing a potential in the auxiliary transformer of the same or opposite polarity to the main transformer, said commutator regulator having a brush connected to an intermediate tap of the exciting winding of the auxiliary transformer, the end taps of the exciting winding being alternately connected through switches to ground.

4. In a tap-changing system for transformers the combination with a main transformer and a power circuit, of an auxiliary transformer, tap-changing switches for connecting the power circuit to the main transformer through the auxiliary transformer, and means comprising a commutator regulator and a potential divider for producing a potential in the auxiliary transformer of the same or opposite polarity to the main transformer, said potential divider having intermediate taps connected to the segments of the commutator and one end terminal connected to a predetermined potential tap of the main transformer while the other terminal is alternately connected through switches to the grounded terminal of the main transformer winding or to a transformer tap having a potential twice as high as the first-named transformer tap.

5. In a tap-changing system for transformers the combination with a main transformer and a power circuit, of an auxiliary transformer, tap-changing switches for connecting the power circuit to the main transformer through the auxiliary transformer, and means comprising a commutator regulator and a potential divider for producing a potential in the auxiliary transformer of the same or opposite polarity to the main transformer, said potential divider being connected along the taps of the low potential winding of the main transformer which lie on both sides of a tap to which one terminal of the exciting winding of the auxiliary transformer is connected, the other terminal of the exciting winding being connected to the brush of the commutator regulator.

RUDOLF PULLER.
HEINRICH KANN.